(12) United States Patent
Zhu

(10) Patent No.: US 12,270,417 B1
(45) Date of Patent: Apr. 8, 2025

(54) BRACKET ASSEMBLY AND FAN WITH BRACKET ASSEMBLY

(71) Applicant: Guangdong Aoyun Technology Co., Ltd., Guangdong (CN)

(72) Inventor: Xueping Zhu, Guangdong (CN)

( * ) Notice: Subject to any disclaimer, the term of this patent is extended or adjusted under 35 U.S.C. 154(b) by 0 days.

(21) Appl. No.: 18/629,587

(22) Filed: Apr. 8, 2024

(30) Foreign Application Priority Data

Mar. 27, 2024 (CN) .......................... 202420615199.8

(51) Int. Cl.
| | |
|---|---|
| *F04D 29/60* | (2006.01) |
| *F04D 29/64* | (2006.01) |
| *F16M 11/40* | (2006.01) |
| *F16M 13/02* | (2006.01) |

(52) U.S. Cl.
CPC .......... *F04D 29/601* (2013.01); *F04D 29/646* (2013.01); *F16M 11/40* (2013.01); *F16M 13/02* (2013.01)

(58) Field of Classification Search
CPC ..... F04D 29/601; F04D 29/646; F16M 11/40; F16M 13/02
USPC ................................ 416/246; 248/126, 163.1
See application file for complete search history.

(56) References Cited

U.S. PATENT DOCUMENTS

| | | | | |
|---|---|---|---|---|
| 4,570,887 | A * | 2/1986 | Banister | F16M 11/041 248/223.41 |
| 8,197,149 | B2 * | 6/2012 | Darrow | F16M 11/36 396/428 |
| 11,619,342 | B1 * | 4/2023 | Chen | F04D 29/646 248/188.8 |

* cited by examiner

Primary Examiner — Christopher Verdier

(57) ABSTRACT

A bracket assembly and a fan with a bracket assembly include: an installation bracket, the installation bracket being equipped with an installation part; and at least one bendable and shapeable supporting leg, the supporting leg being connected to the installation part. Therefore, users can connect the installation bracket to an external device, thereby attaching the bendable and shapeable supporting leg to the external device, so that the external device can be suspended or supported on an external object through the bendable and shapeable supporting leg. At the same time, a support angle of the supporting leg can be adjusted by bending the supporting leg to adjust an angle of the external device. Moreover, a total number of the supporting legs can be set to 3-10, so that the supporting legs can be combined with each other to form an octopus shape to provide stable support.

13 Claims, 11 Drawing Sheets

BRACKET ASSEMBLY AND FAN WITH BRACKET ASSEMBLY

CROSS-REFERENCE TO RELATED APPLICATIONS

The application claims priority of Chinese patent application CN 202420615199.8, filed on Mar. 27, 2024, which is incorporated herein by reference in its entireties.

TECHNICAL FIELD

The present invention relates to a field of fans, in particular to a bracket assembly and a fan with a bracket assembly.

BACKGROUND ART

Existing fans on the market are mostly supported by fixed support bases or fixed with clips. Due to the limitations of the installation methods, the applicability of the fans is limited, greatly affecting the user experience. Therefore, there is an urgent need to provide a bracket assembly and a fan with a bracket assembly that can be used in multiple scenarios and are easy and stable to install, so as to improve the user experience.

SUMMARY

In order to overcome the shortcomings of existing technology, a bracket assembly is provided by the present invention, including: an installation bracket, the installation bracket being equipped with an installation part; and at least one bendable and shapeable supporting leg, the supporting leg being connected to the installation part.

As an improvement of the present invention, the supporting leg includes a flexible protective sleeve, and a bendable and shapeable metal wire. The metal wire is arranged inside the flexible protective sleeve, so that the flexible protective sleeve covers the metal wire.

As an improvement of the present invention, the supporting leg is detachably connected to the installation part.

As an improvement of the present invention, the installation part is equipped with an installation opening, and the supporting leg is inserted into the installation opening.

As an improvement of the present invention, one end of the supporting leg is equipped with a first stop part. The supporting leg passes through the installation opening from an upper surface of the installation bracket to a lower surface of the installation bracket. The installation bracket keeps the first stop part on the upper surface of the installation bracket.

As an improvement of the present invention, the supporting leg is further equipped with an insertion part. The insertion part is inserted into the installation opening.

As an improvement of the present invention, the installation bracket is further provided with a sliding block. The sliding block is used for connecting to a sliding groove of an external device.

As an improvement of the present invention, the metal wire extends from a first end of the flexible protective sleeve to a second end of the flexible protective sleeve. An end of the metal wire is equipped with a stop ring. The stop ring is positioned within the first stop part.

As an improvement of the present invention, the flexible protective sleeve includes a plurality of protrusions and a plurality of grooves. The plurality of protrusions and the plurality of grooves are arranged at intervals with each other.

As an improvement of the present invention, the flexible protective sleeve is a silicone protective sleeve or a rubber protective sleeve.

A fan with a bracket assembly is further provided by the present invention, including: a main body of fan, the main body of fan being equipped with an installation fitting part; and a bracket assembly. The bracket assembly includes an installation bracket and at least one bendable and shapeable supporting leg. The installation bracket is equipped with an installation part. The supporting leg is connected to the installation part. The installation part is connected to the installation fitting part.

As an improvement of the present invention, the supporting leg includes a flexible protective sleeve, and a bendable and shapeable metal wire. The metal wire is arranged inside the flexible protective sleeve, so that the flexible protective sleeve covers the metal wire.

As an improvement of the present invention, the supporting leg is detachably connected to the installation part.

As an improvement of the present invention, the installation part is equipped with an installation opening, and the supporting leg is inserted into the installation opening.

As an improvement of the present invention, one end of the supporting leg is equipped with a first stop part. The supporting leg passes through the installation opening from an upper surface of the installation bracket to a lower surface of the installation bracket. The installation bracket keeps the first stop part on the upper surface of the installation bracket.

As an improvement of the present invention, the supporting leg is further equipped with an insertion part. The insertion part is inserted into the installation opening.

As an improvement of the present invention, the metal wire extends from a first end of the flexible protective sleeve to a second end of the flexible protective sleeve. An end of the metal wire is equipped with a stop ring. The stop ring is positioned within the first stop part.

As an improvement of the present invention, the flexible protective sleeve includes a plurality of protrusions and a plurality of grooves. The plurality of protrusions and the plurality of grooves are arranged at intervals with each other.

As an improvement of the present invention, the installation bracket is further provided with a sliding block. The installation fitting part is a sliding groove, and the sliding block is connected to the sliding groove.

As an improvement of the present invention, when the sliding block is connected to the sliding groove, the installation bracket and an inner wall of the sliding groove cooperatively clamp the first stop part.

As an improvement of the present invention, the installation bracket includes the installation part and a second stop part. The installation part is connected to the second stop part, and the installation part and the second stop part are arranged at an obtuse angle, an acute angle or a right angle. The main body of fan is provided with a stop groove, and the sliding block is positioned on the installation part. When the sliding block is connected to the sliding groove, the second stop part is connected to the stop groove.

As an improvement of the present invention, the second stop part is equipped with a hollow handle.

The bracket assembly and the fan with the bracket assembly are provided by the present invention, including the installation bracket and at least one bendable and shapeable supporting leg. The installation bracket is equipped with the installation part. The supporting leg is connected to the installation part. Therefore, users can connect the installation bracket to the external device, thereby attaching the bendable and shapeable supporting leg to the external device, so that the external device can be suspended or supported on an external object through the bendable and shapeable supporting leg. At the same time, a support angle of the supporting leg can be adjusted by bending the supporting leg, so as to adjust an angle of the external device. Moreover, a total number of the supporting legs can be set to 3-10, so that the supporting legs can be combined with each other to form an octopus shape to provide more stable support. For example, when it is necessary to hang the external device on a shelf, the supporting leg can be bent into an annular shape, so as to hang the supporting leg on the shelf, and a hanging angle of the external device can be adjusted through the bendable supporting leg. For another example, when it is necessary to place the external device on a flat surface such as a desktop, the supporting leg can be bent to form a support surface, so as to place the supporting leg on the flat surface such as the desktop, and a placement angle of the external device can be adjusted trough the bendable supporting leg.

BRIEF DESCRIPTION OF THE DRAWINGS

Implementations of the present disclosure will now be described, by way of embodiment, with reference to the attached figures. It should be understood, the drawings are shown for illustrative purpose only, for an ordinary person skilled in the art, other drawings obtained from these drawings by an ordinary person skilled in the art should be within scope of the present disclosure.

DETAILED DESCRIPTION OF THE EMBODIMENTS

Figure 1:
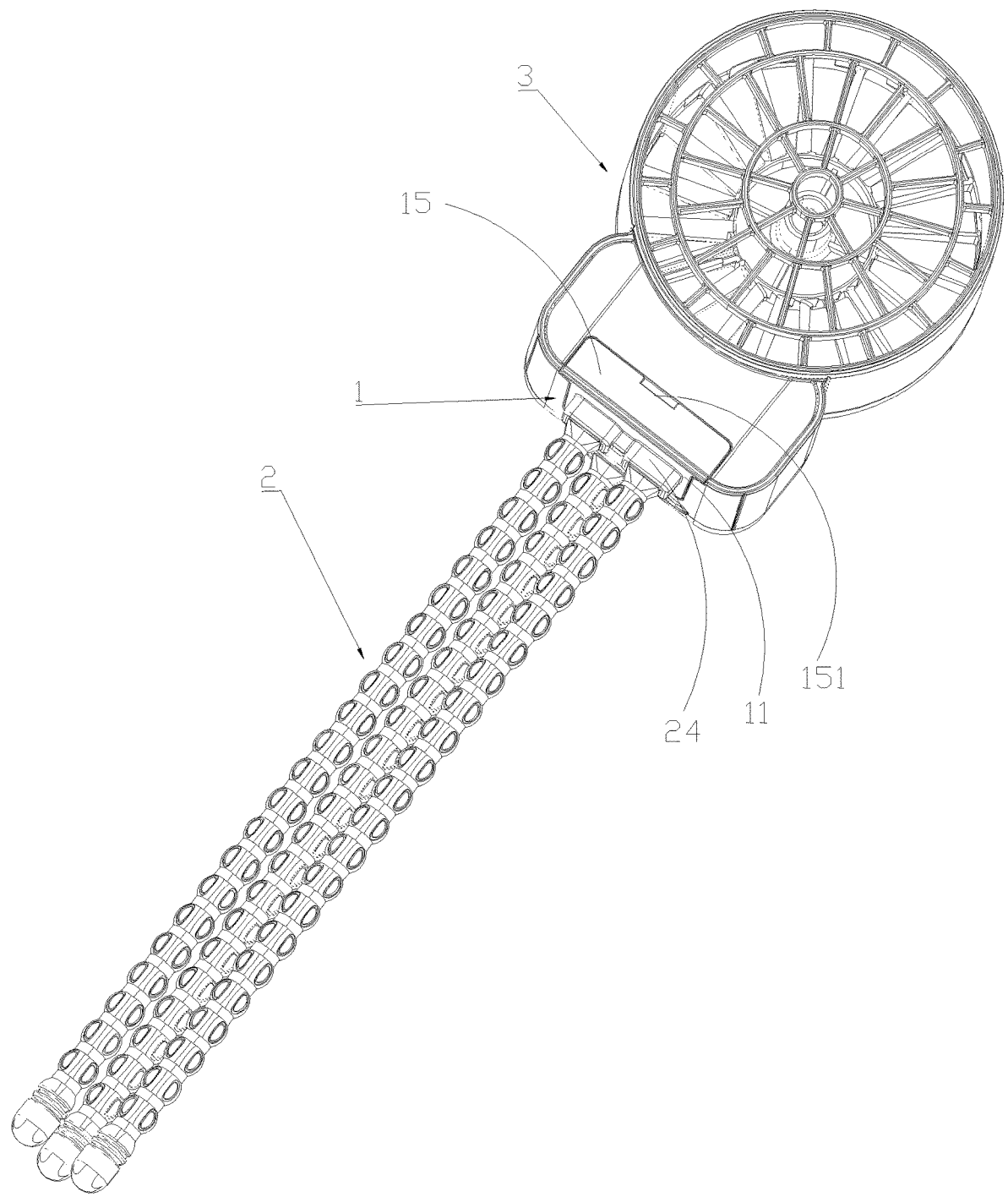
FIG. 1 is a schematic diagram of an overall structure according to the present invention.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising" when utilized, means "including, but not necessarily limited to"; it specifically indicates open-ended inclusion or membership in the so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one". In addition, the terms "first" and "second" are used for descriptive purposes only and cannot be understood as indicating or implying relative importance or implying the number of indicated technical features. Thus, the features defined as "first" and "second" may explicitly or implicitly include one or more of the features. In the description of embodiments of the application, "a plurality of" means two or more, unless otherwise specifically defined.

Figure 2:
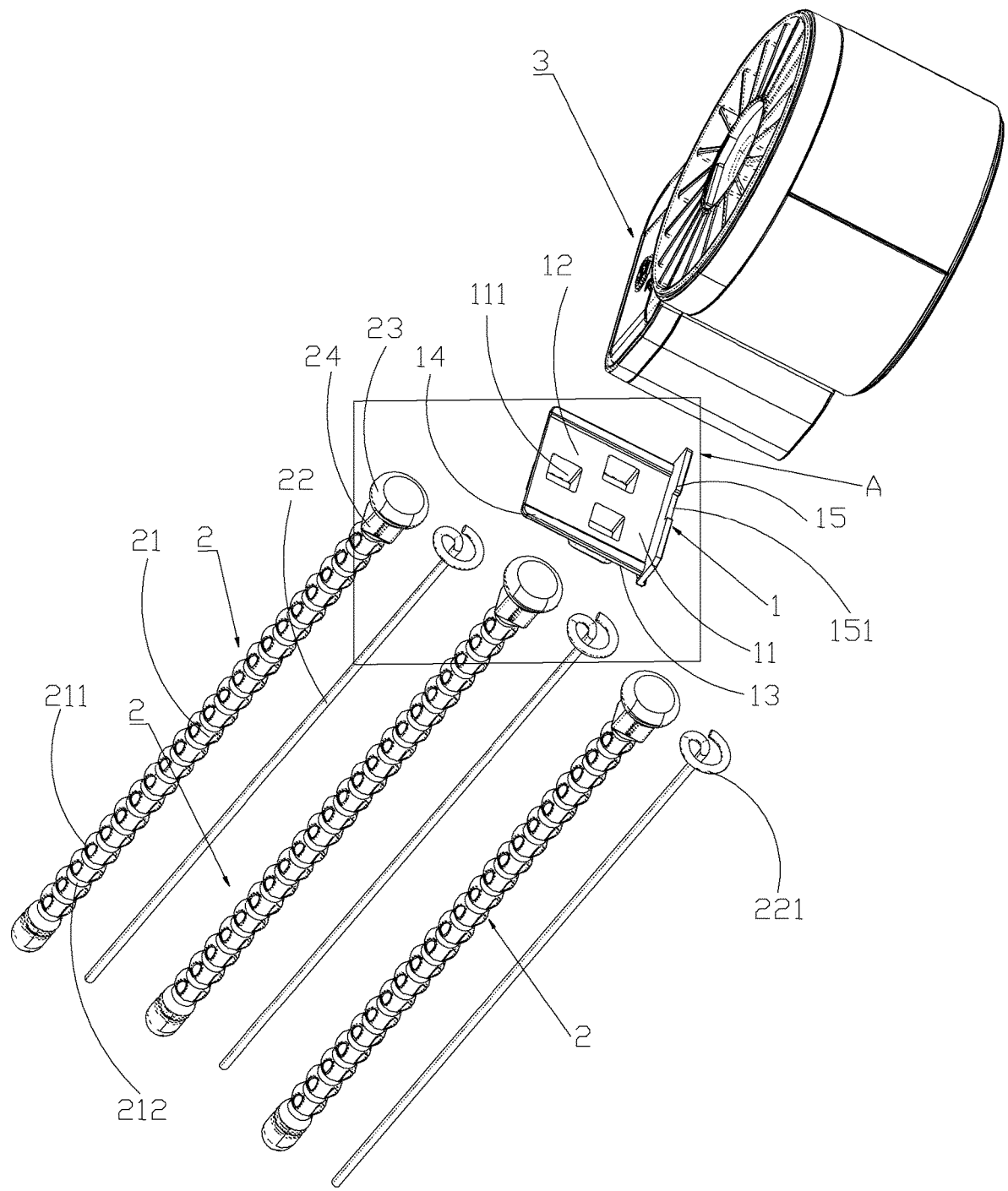
FIG. 2 is an exploded view according to the present invention.
Figure 3:
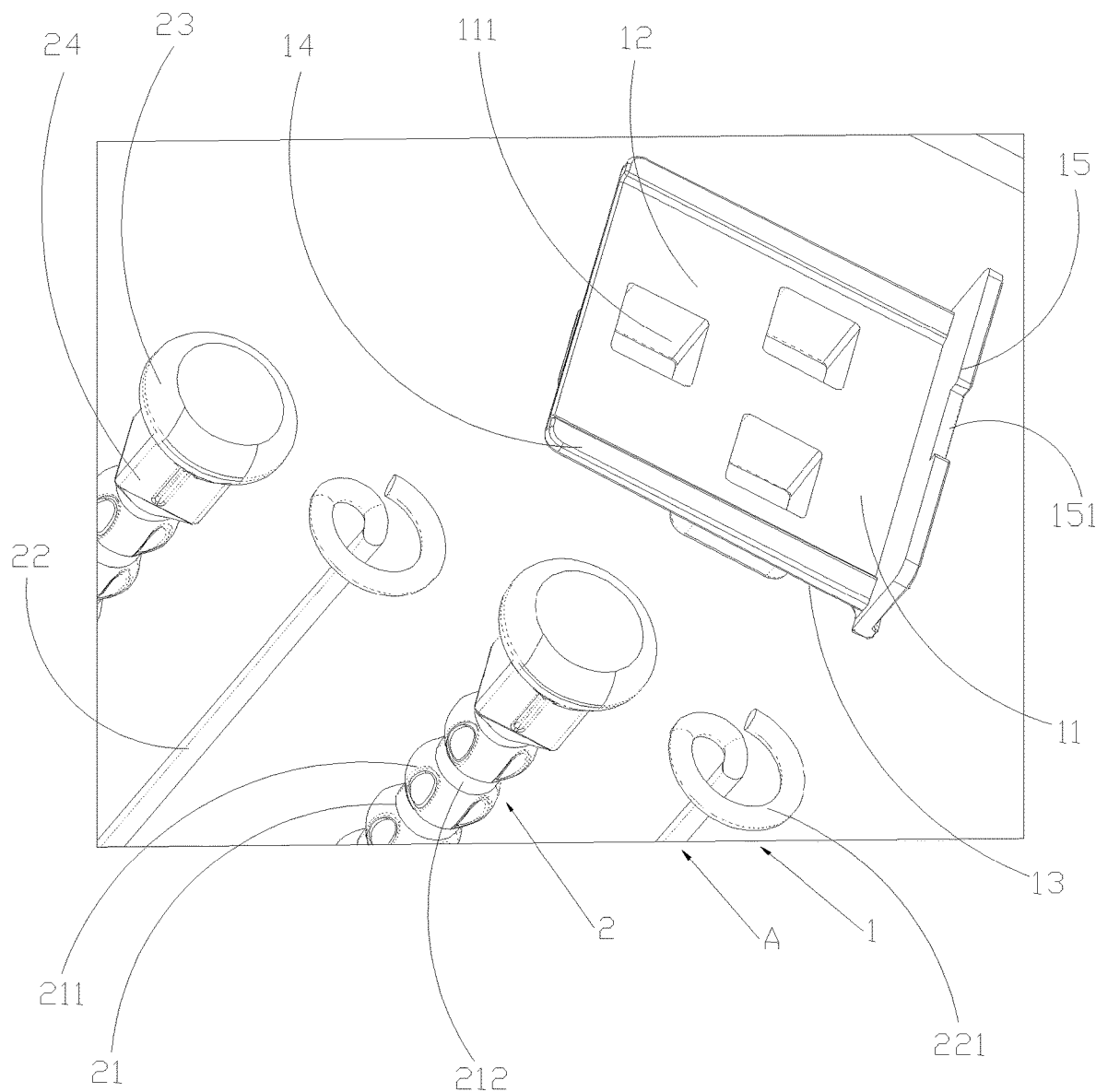
FIG. 3 is an enlarged view of area A in FIG. 2.
Figure 4:
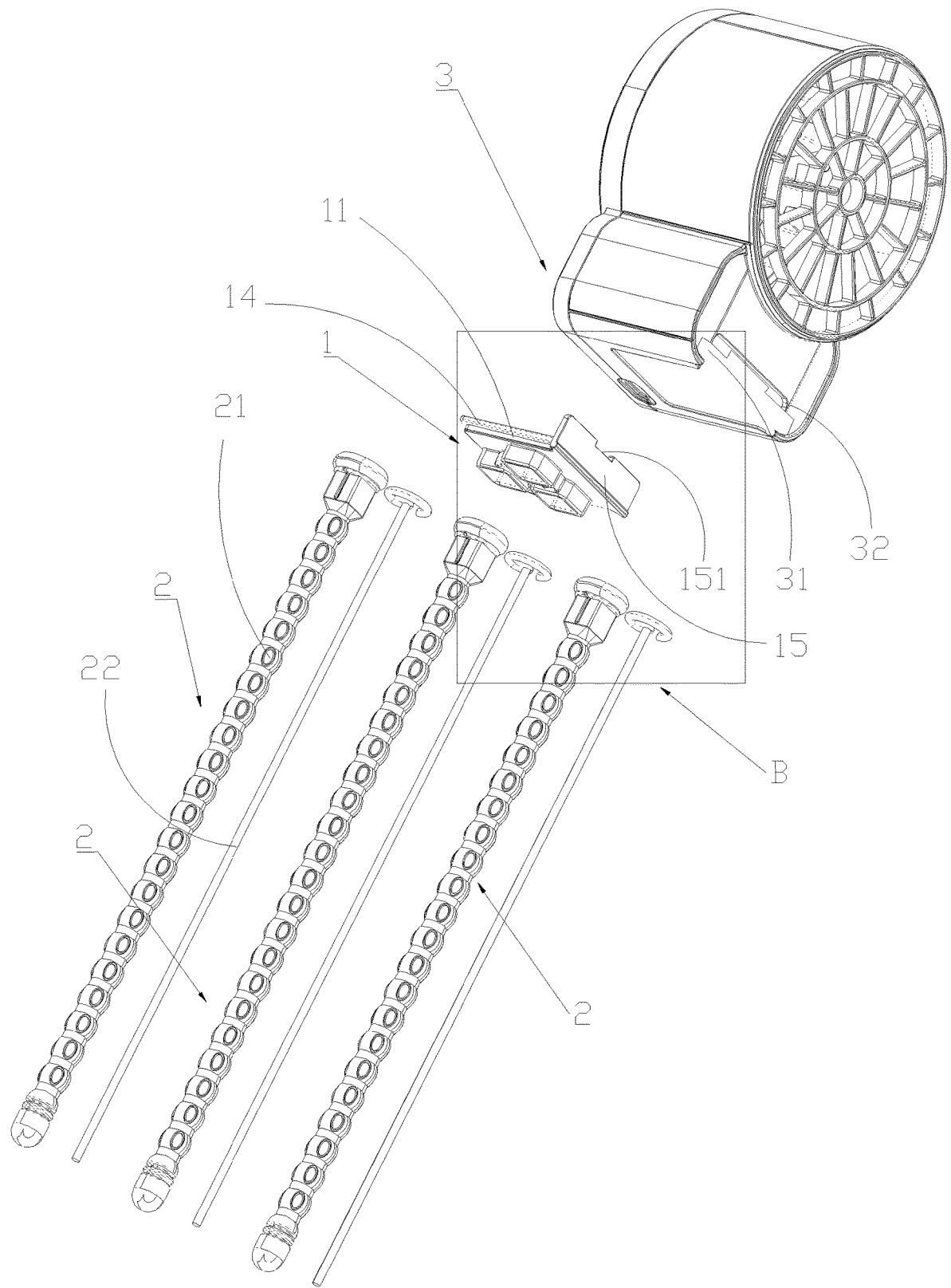
FIG. 4 is another exploded view according to the present invention.
Figure 5:
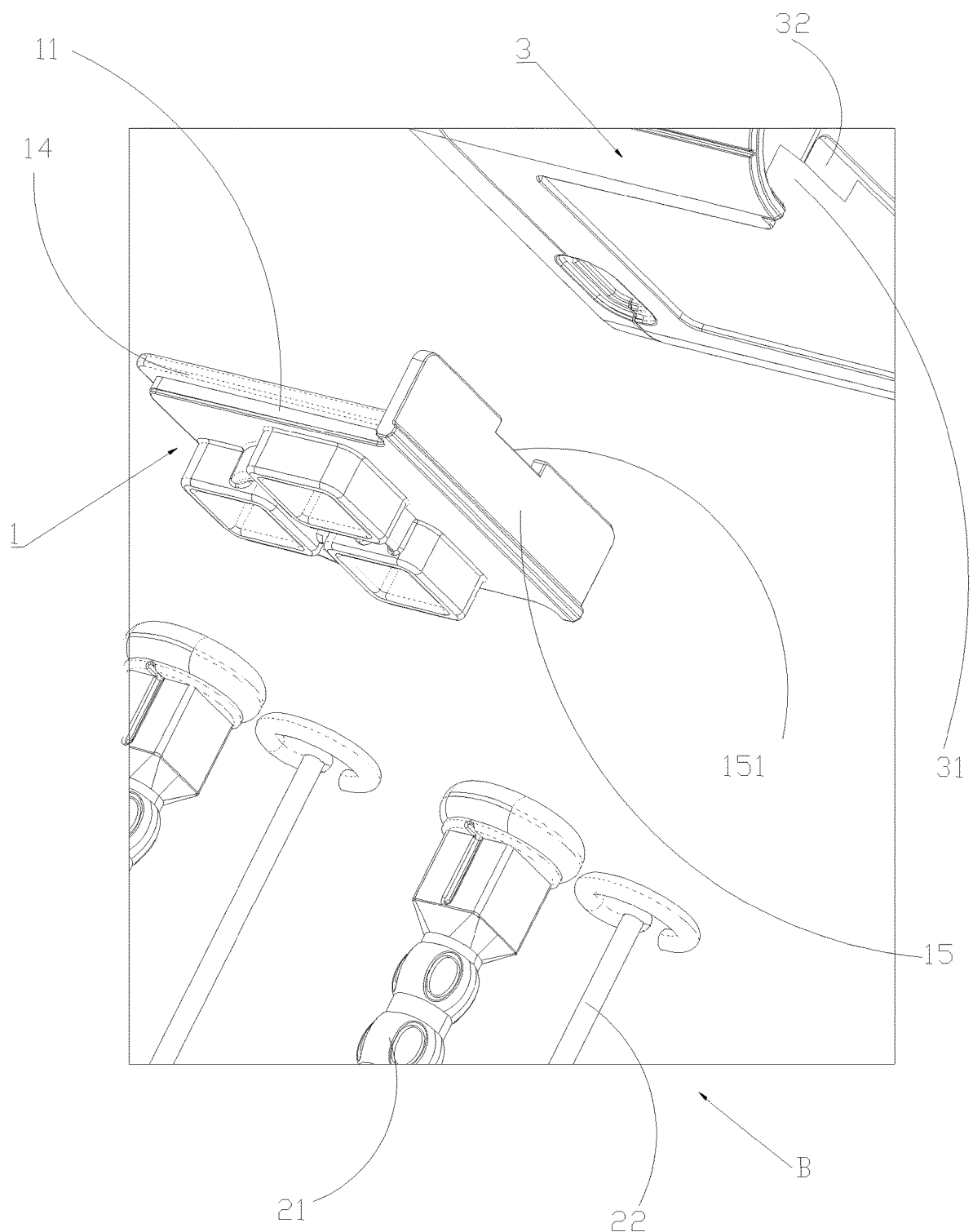
FIG. 5 is an enlarged view of area B in FIG. 4.
Figure 6:
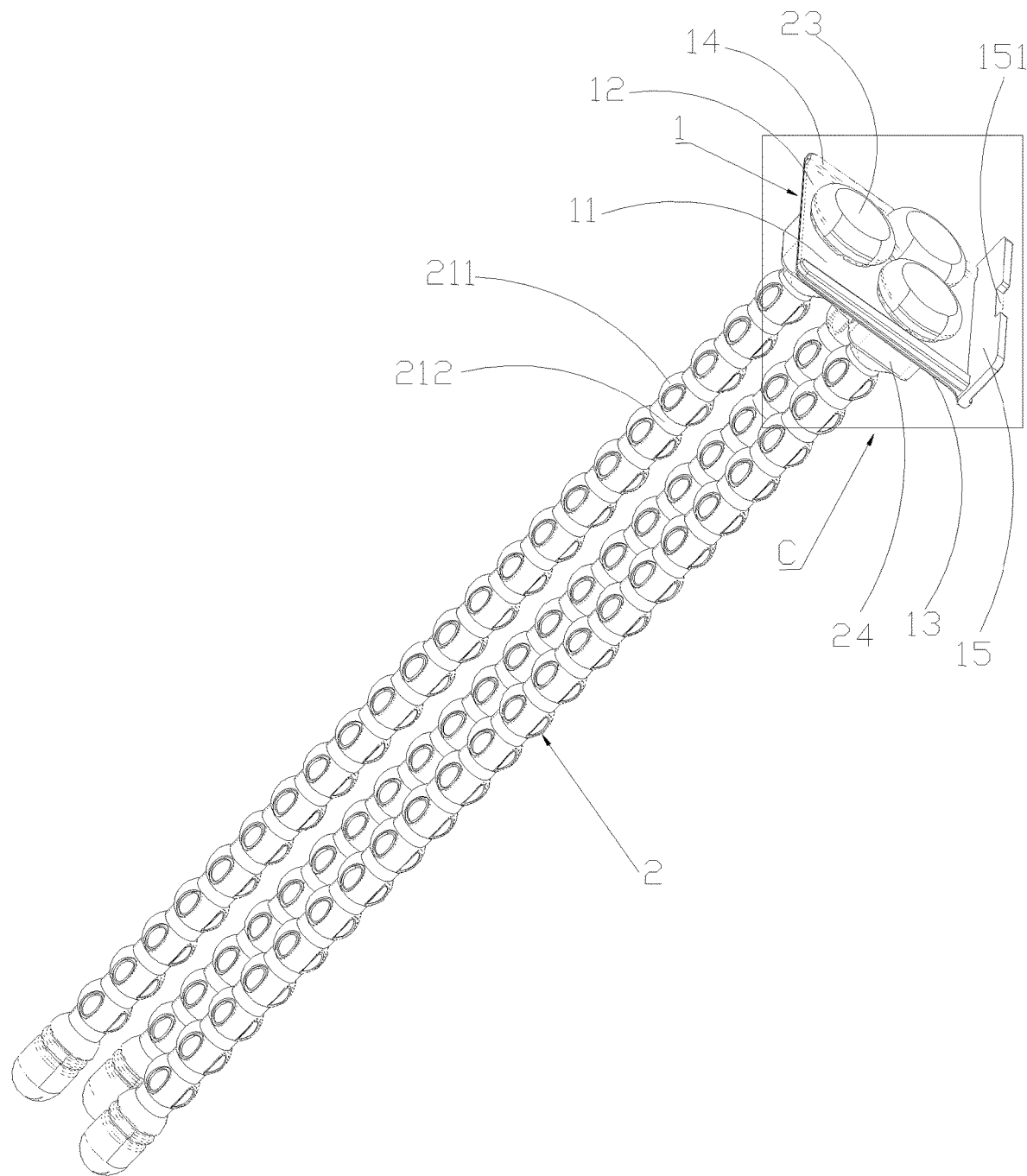
FIG. 6 is a schematic diagram of a structure of a bracket assembly.
Figure 7:
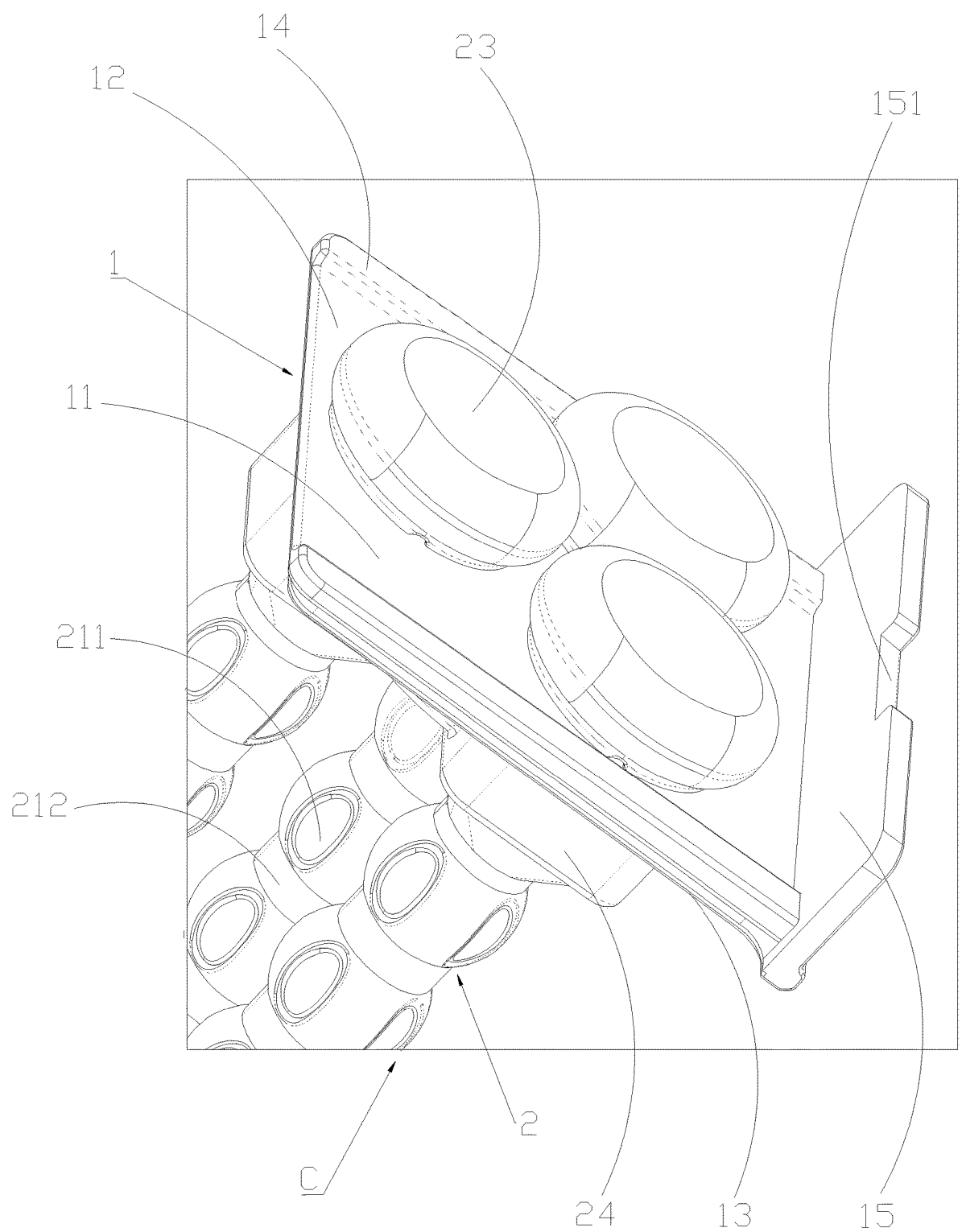
FIG. 7 is an enlarged view of area C in FIG. 6.
Figure 8:
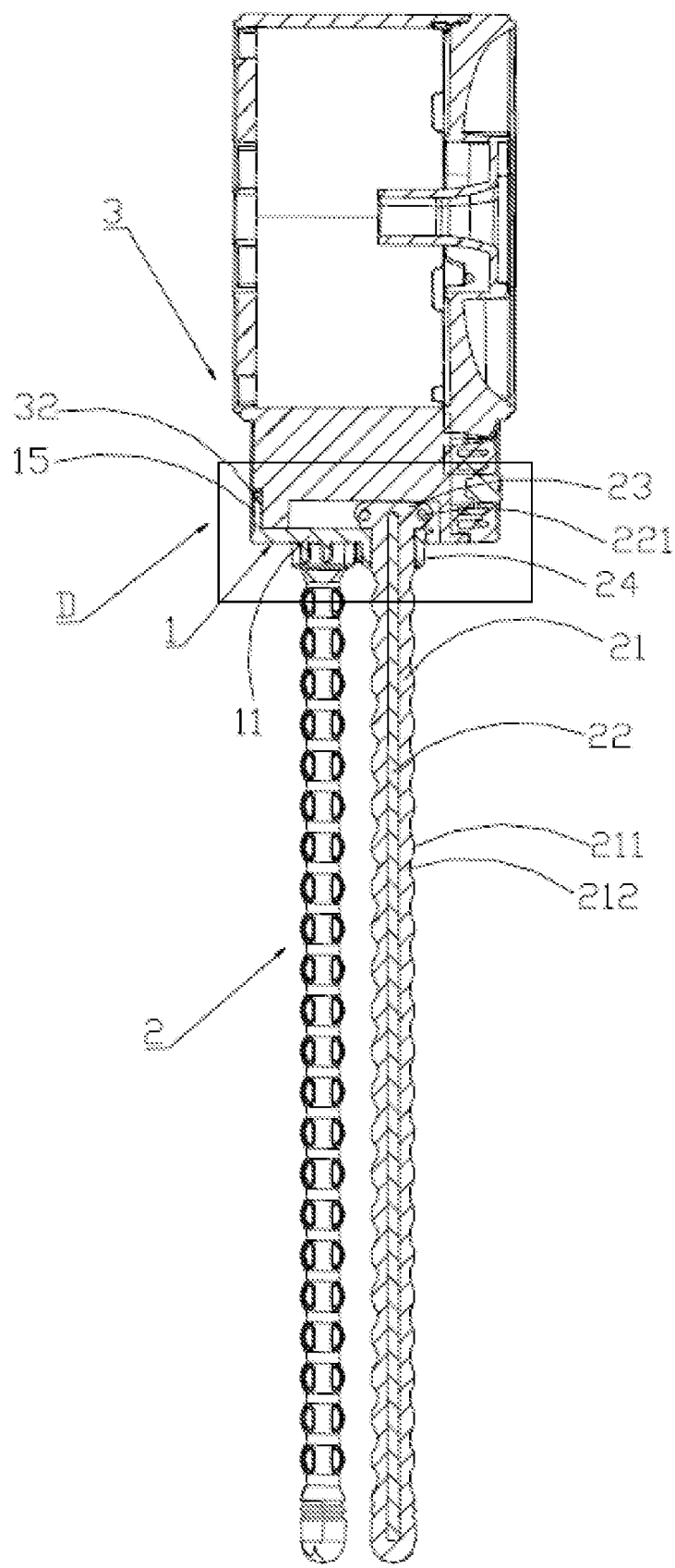
FIG. 8 is a sectional view of an installation bracket and a supporting leg.
Figure 9:
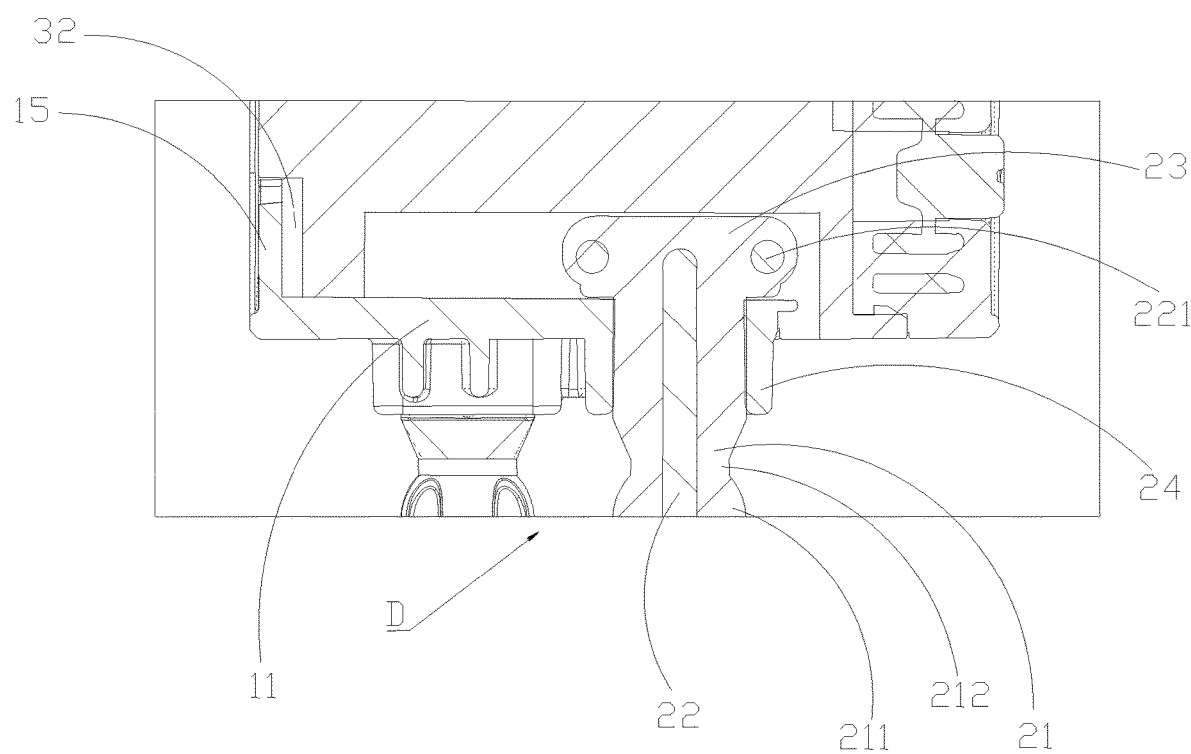
FIG. 9 is an enlarged view of area D in FIG. 8.
Figure 10:
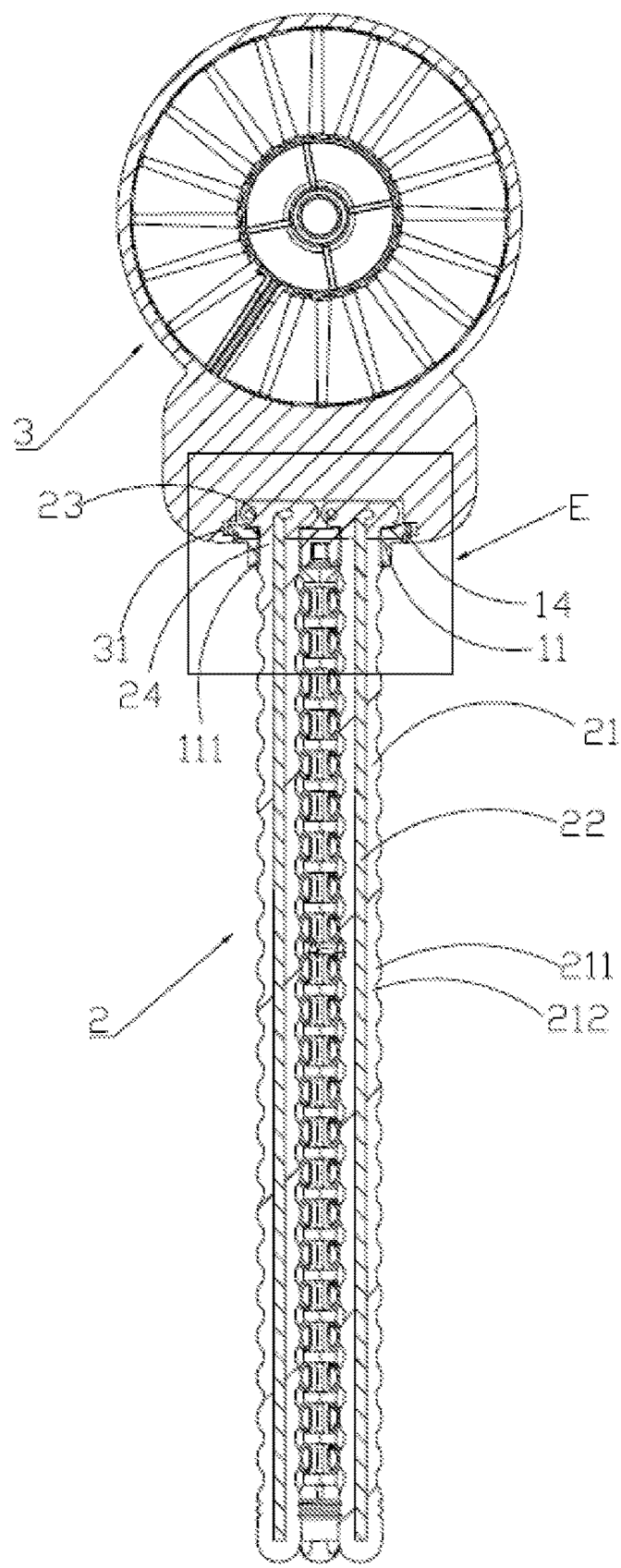
FIG. 10 is another sectional view of an installation bracket and a supporting leg.
Figure 11:
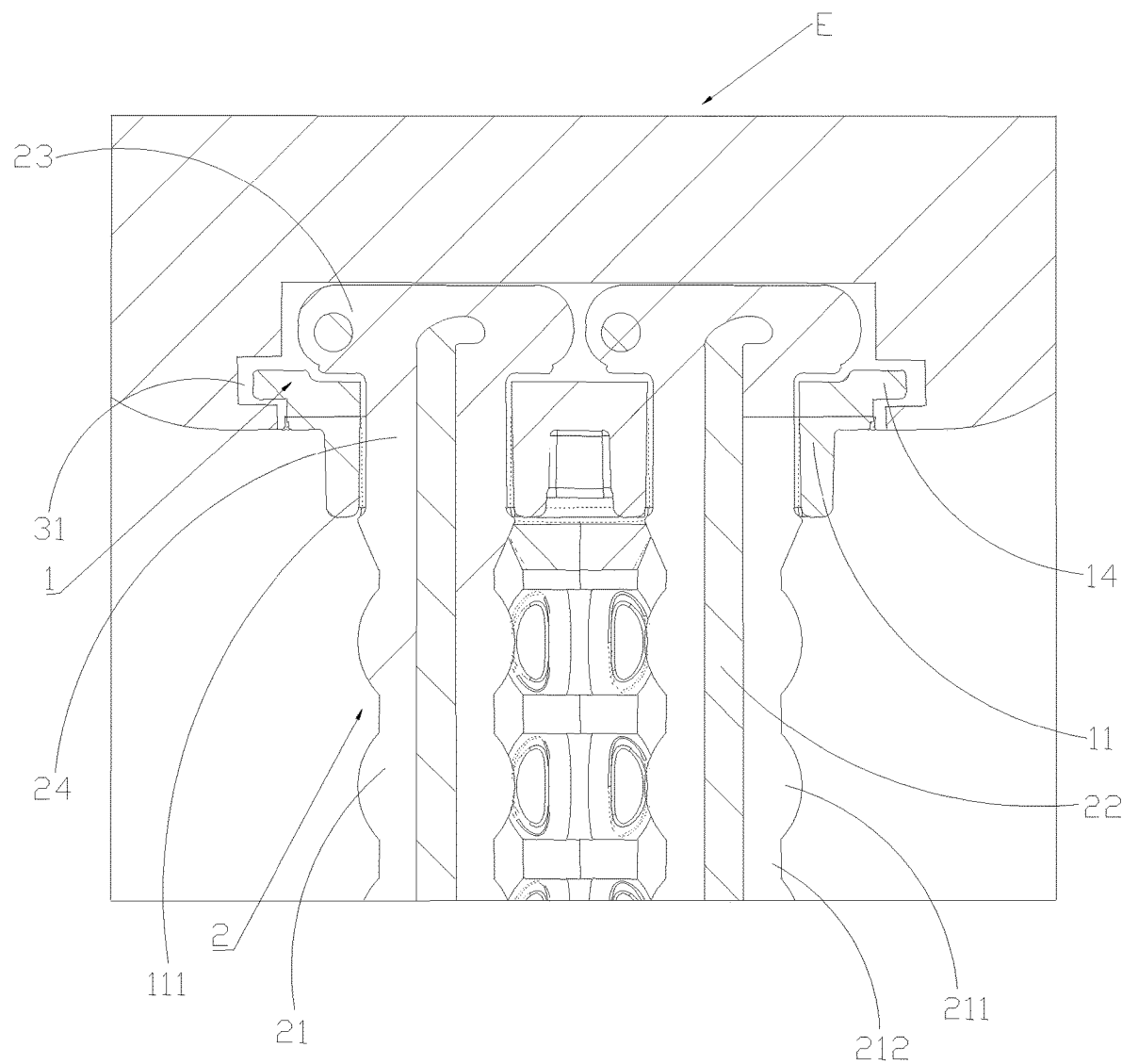
FIG. 11 is an enlarged view of area E in FIG. 10.

Referring to FIGS. 1-11, a bracket assembly includes: an installation bracket 1, the installation bracket 1 being equipped with an installation part 11; and at least one bendable and shapeable supporting leg 2, the supporting leg 2 being connected to the installation part 11.

Through the above structure, the bracket assembly includes the installation bracket 1 and at least one bendable and shapeable supporting leg 2, the installation bracket 1 is equipped with the installation part 11, and the supporting leg 2 is connected to the installation part 11. Therefore, users can connect the installation bracket 1 to an external device, thereby attaching the bendable and shapeable supporting leg 2 to the external device, so that the external device can be suspended or supported on an external object through the bendable and shapeable supporting leg 2. At the same time, a support angle of the supporting leg 2 can be adjusted by bending the supporting leg 2, so as to adjust an angle of the external device. Moreover, a total number of the supporting legs 2 can be set to 3-10, so that the supporting legs 2 can be combined with each other to form an octopus shape to provide more stable support. For example, when it is necessary to hang the external device on a shelf, the supporting leg 2 can be bent into an annular shape, so as to hang the supporting leg 2 on the shelf, and a hanging angle of the external device can be adjusted through the bendable supporting leg 2. For another example, when it is necessary to place the external device on a flat surface such as a desktop, the supporting leg 2 can be bent to form a support surface, so as to place the supporting leg 2 on the flat surface such as the desktop, and a placement angle of the external device can be adjusted trough the bendable supporting leg 2.

The external device can be a fan, a phone holder, a humidifier, a desk lamp, a desktop decoration and other devices.

In this embodiment, the supporting leg 2 includes a flexible protective sleeve 21, and a bendable and shapeable metal wire 22. The metal wire 22 is arranged inside the flexible protective sleeve 21, so that the flexible protective sleeve 21 covers the metal wire 22. Specifically, the flexible protective sleeve 21 includes a plurality of protrusions 211 and a plurality of grooves 212. The plurality of protrusions 211 and the plurality of grooves 212 are arranged at intervals with each other. Specifically, the flexible protective sleeve 21 is a silicone protective sleeve or a rubber protective sleeve. Through the above structure, by covering the metal wire 22 with the flexible protective sleeve 21, the characteristics of the metal wire 22 being bendable and shapeable can be utilized, so that the external device can be suspended or supported on the external object through the bendable and shapeable metal wire 22. Moreover, the flexible protective sleeve 21 covered on a surface is capable of protecting the metal wire 22, while making the supporting leg 2 more beautiful and tactile. Furthermore, since the flexible protective sleeve 21 includes the plurality of protrusions 211 and the plurality of grooves 212, and the protrusions 211 and the grooves 212 are arranged at intervals with each other, the metal wire 22 of the supporting leg 2 can be bent at the grooves 212, resulting in better shaping effect and effectively improving the stability of the supporting leg 2. This facilitates an adjustment of the support angle of the supporting leg 2 to adjust the angle of the external device.

In this embodiment, the supporting leg 2 is detachably connected to the installation part 11. The installation part 11 is equipped with an installation opening 111, and the supporting leg 2 is inserted into the installation opening 111. Specifically, one end of the supporting leg 2 is equipped with a first stop part 23. The supporting leg 2 passes through the installation opening 111 from an upper surface 12 of the installation bracket 1 to a lower surface 13 of the installation bracket 1. The installation bracket 1 keeps the first stop part 23 on the upper surface 12 of the installation bracket 1. Specifically, the metal wire 22 extends from a first end of the flexible protective sleeve 21 to a second end of the flexible protective sleeve 21. An end of the metal wire 22 is equipped with a stop ring 221. The stop ring 221 is positioned within the first stop part 23. Furthermore, the supporting leg 2 is further equipped with an insertion part 24. The insertion part 24 is inserted into the installation opening 111. Through the above structure, an installation of the supporting leg 2 and the installation bracket 1 is effectively achieved, making it convenient for users to install the supporting leg 2 on the installation bracket 1. During a production process, the supporting leg 2 and the installation bracket 1 can be separately formed, and then the supporting leg 2 can be combined with the installation bracket 1 to form the bracket assembly, thereby effectively improving production efficiency and product yield (i.e., manufacturing yield).

In this embodiment, the installation bracket 1 is further provided with a sliding block 14. The sliding block 14 is used for connecting to a sliding groove of the external device. Through the above structure, the sliding block 14 on the installation bracket 1 can slide into the sliding groove of the external device to complete an installation of the bracket assembly, thereby attaching the bendable and shapeable supporting leg 2 to the external device, so that the external device can be suspended or supported on an external object through the bendable and shapeable supporting leg 2. At the same time, a support angle of the supporting leg 2 can be adjusted by bending the supporting leg 2, so as to adjust an angle of the external device. For example, when it is necessary to hang the external device on a shelf, the supporting leg 2 can be bent into an annular shape, so as to hang the supporting leg 2 on the shelf, and a hanging angle of the external device can be adjusted through the bendable supporting leg 2. For another example, when it is necessary to place the external device on a flat surface such as a desktop, the supporting leg 2 can be bent to form a support surface, so as to place the supporting leg 2 on the flat surface such as the desktop, and a placement angle of the external device can be adjusted trough the bendable supporting leg 2.

Referring to FIGS. 1-11, a fan with a bracket assembly includes: a main body of fan 3, the main body of fan 3 being equipped with an installation fitting part 31; and a bracket assembly. The bracket assembly includes an installation bracket 1 and at least one bendable and shapeable supporting leg 2. The installation bracket 1 is equipped with an installation part 11. The supporting leg 2 is connected to the installation part 11. The installation part 11 is connected to the installation fitting part 31.

Through the above structure, the fan with the bracket assembly includes the main body of fan 3 and the bracket assembly. The main body of fan 3 is equipped with the installation fitting part 31. The bracket assembly includes the installation bracket 1 and at least one bendable and shapeable supporting leg 2. The installation bracket 1 is equipped with the installation part 11. The supporting leg 2 is connected to the installation part 11, and the installation part 11 is connected to the installation fitting part 31. Therefore, users can connect the installation bracket 1 to the main body of fan 3, thereby attaching the bendable and shapeable supporting leg 2 to the main body of fan 3, so that the fan body 3 can be suspended or supported on an external object through the bendable and shapeable supporting leg 2. At the same time, a support angle of the supporting leg 2 can be adjusted by bending the supporting leg 2, so as to adjust a angle of the main body of fan 3. Moreover, a total number of the supporting leg 2 can be set to 3-10, so that the supporting legs 2 can be combined with each other to form an octopus shape to provide more stable support. For example, when it is necessary to hang the main body of fan 3 on a shelf, the supporting leg 2 can be bent into an annular shape to hang the supporting leg 2 on the shelf, and a hanging angle of the main body of fan 3 can be adjusted through the bendable supporting leg 2. For another example, when it is necessary to place the main body of fan 3 on a flat surface such as a desktop, the supporting leg 2 can be bent to form a supporting surface, so as to place the supporting leg 2 on the flat surface such as the desktop, and a placement angle of the main body of fan 3 can be adjusted through the bendable supporting leg 2.

In this embodiment, the supporting leg 2 includes a flexible protective sleeve 21 and a bendable and shapeable metal wire 22. The metal wire 22 is arranged inside the flexible protective sleeve 21, so that the flexible protective sleeve 21 covers the metal wire 22. Specifically, the flexible protective sleeve 21 includes a plurality of protrusions 211 and a plurality of grooves 212. The plurality of protrusions 211 and the plurality of grooves 212 are arranged at intervals with each other. Specifically, the flexible protective sleeve 21 is a silicone protective sleeve or a rubber protective sleeve. Through the above structure, by covering the metal wire 22 with the flexible protective sleeve 21, the characteristics of the metal wire 22 being bendable and shapeable can be utilized, so that an external device can be suspended or supported on an external object through the bendable and shapeable metal wire 22. Moreover, the flexible protective sleeve 21 covered on a surface is capable of protecting the metal wire 22, while making the supporting leg 2 more beautiful and tactile. Furthermore, since the flexible protective sleeve 21 includes the plurality of protrusions 211 and the plurality of grooves 212, and the protrusions 211 and the grooves 212 are arranged at intervals with each other, the metal wire 22 of the supporting leg 2 can be bent at the grooves 212, resulting in better shaping effect and effectively improving the stability of the supporting leg 2. This facilitates an adjustment of the support angle of the supporting leg 2 to adjust an angle of the external device.

In this embodiment, the supporting leg 2 is detachably connected to the installation part 11. The installation part 11 is equipped with an installation opening 111, and the supporting leg 2 is inserted into the installation opening 111. Specifically, one end of the supporting leg 2 is equipped with a first stop part 23. The supporting leg 2 passes through the installation opening 111 from an upper surface 12 of the installation bracket 1 to a lower surface 13 of the installation bracket 1. The installation bracket 1 keeps the first stop part 23 on the upper surface 12 of the installation bracket 1. Specifically, the metal wire 22 extends from a first end of the flexible protective sleeve 21 to a second end of the flexible protective sleeve 21. An end of the metal wire 22 is equipped with a stop ring 221. The stop ring 221 is positioned within the first stop part 23. Furthermore, the supporting leg 2 is further equipped with an insertion part 24. The insertion part 24 is inserted into the installation opening 111. Through the above structure, an installation of the supporting leg 2 and the installation bracket 1 is effectively achieved, making it convenient for users to install the supporting leg 2 on the installation bracket 1. During a production process, the supporting leg 2 and the installation bracket 1 can be separately formed, and then the supporting leg 2 can be combined with the installation bracket 1 to form the bracket assembly, thereby effectively improving production efficiency and product yield (i.e., manufacturing yield).

In this embodiment, the installation bracket 1 is further provided with a sliding block 14. The installation fitting part 31 is a sliding groove, and the sliding block 14 is connected to the sliding groove. When the sliding block 14 is connected to the sliding groove, the installation bracket 1 and an inner wall of the sliding groove cooperatively clamp the first stop part 23. Specifically, the installation bracket 1 includes the installation part 11 and a second stop part 15. The installation part 11 is connected to the second stop part 15, and the installation part 11 and the second stop part 15 are arranged at an obtuse angle, an acute angle or a right angle. The main body of fan 3 is provided with a stop groove 32, and the sliding block 14 is positioned on the installation part 11. When the sliding block 14 is connected to the sliding groove, the second stop part 15 is connected to the stop groove 32. Furthermore, the second stop part 15 is equipped with a hollow handle 151. Through the above structure, the sliding block 14 on the installation bracket 1 can slide into the sliding groove of the main body of fan 3 to complete an installation of the bracket assembly, thereby attaching the bendable and shapeable supporting leg 2 to the main body of fan 3, so that the main body of fan 3 can be suspended or supported on an external object through the bendable and shapeable supporting leg 2. At the same time, a support angle of the supporting leg 2 can be adjusted by bending the supporting leg 2, so as to adjust an angle of the main body of fan 3. For example, when it is necessary to hang the main body of fan 3 on a shelf, the supporting leg 2 can be bent into an annular shape, so as to hang the supporting leg 2 on the shelf, and a hanging angle of the main body of fan 3 can be adjusted through the bendable supporting leg 2. For another example, when it is necessary to place the main body of fan 3 on a flat surface such as a desktop, the supporting leg 2 can be bent to form a support surface, so as to place the supporting leg 2 on the flat surface such as the desktop, and a placement angle of the main body of fan 3 can be adjusted trough the bendable supporting leg 2.

The above description only describes embodiments of the present disclosure, and is not intended to limit the present disclosure; various modifications and changes can be made to the present disclosure. Any modifications, equivalent substitutions, and improvements made within the spirit and scope of the present disclosure are intended to be included within the scope of the present disclosure.

What is claimed is:

1. A bracket assembly comprising:
   an installation bracket, the installation bracket being equipped with an installation part; and
   at least one bendable and shapeable supporting leg, the supporting leg being connected to the installation part,
   wherein the installation part is equipped with an installation opening, and the supporting leg is inserted into the installation opening, and one end of the supporting leg is equipped with a first stop part, the supporting leg passes through the installation opening from an upper surface of the installation bracket to a lower surface of the installation bracket, and the installation bracket keeps the first stop part on the upper surface of the installation bracket.

2. The bracket assembly of claim 1, wherein the supporting leg comprises a flexible protective sleeve, and a bendable and shapeable metal wire; the metal wire is arranged inside the flexible protective sleeve, so that the flexible protective sleeve covers the metal wire.

3. The bracket assembly of claim 2, wherein the supporting leg is detachably connected to the installation part.

4. The bracket assembly of claim 2, wherein the flexible protective sleeve comprises a plurality of protrusions and a plurality of grooves, and the plurality of protrusions and the plurality of grooves are arranged at intervals with each other.

5. The bracket assembly of claim 2, wherein the flexible protective sleeve is a silicone protective sleeve or a rubber protective sleeve.

6. The bracket assembly of claim 1, wherein the supporting leg is further equipped with an insertion part, and the insertion part is inserted into the installation opening.

7. The bracket assembly of claim 1, wherein the installation bracket is further provided with a sliding block, and the sliding block is used for connecting to a sliding groove of an external device.

8. The bracket assembly of claim 1, wherein the metal wire extends from a first end of the flexible protective sleeve to a second end of the flexible protective sleeve, an end of the metal wire is equipped with a stop ring, and the stop ring is positioned within the first stop part.

9. A fan with a bracket assembly comprising:
   a main body, the main body being equipped with an installation fitting part; and
   the bracket assembly, wherein the bracket assembly comprises an installation bracket, and at least one bendable and shapeable supporting leg: the installation bracket is equipped with an installation part; the supporting leg is connected to the installation part;
   wherein the installation bracket is further provided with a sliding block arranged in a lengthwise direction of the installation part, and a second stop part arranged in a widthwise direction of the installation part, the installation fitting part comprises a sliding groove and a stop groove, the installation part is slidably connected to the installation fitting part in a manner that the sliding block is connected to the sliding groove, and the second stop part is connected to the stop groove,
   wherein the supporting leg comprises a flexible protective sleeve, and a bendable and shapeable metal wire; the metal wire is arranged inside the flexible protective sleeve, so that the flexible protective sleeve covers the metal wire,
   wherein the supporting leg is detachably connected to the installation part, wherein the installation part is equipped with an installation opening, and the supporting leg is inserted into the installation opening, wherein one end of the supporting leg is equipped with a first stop part, the supporting leg passes through the installation opening from an upper surface of the installation bracket to a lower surface of the installation bracket, and the installation bracket keeps the first stop part on the upper surface of the installation bracket.

10. The fan with the bracket assembly of claim 9, wherein the supporting leg is further equipped with an insertion part, and the insertion part is inserted into the installation opening.

11. The fan with the bracket assembly of claim 9, wherein the metal wire extends from a first end of the flexible protective sleeve to a second end of the flexible protective sleeve, an end of the metal wire is equipped with a stop ring, the stop ring is positioned within the first stop part.

12. The fan with the bracket assembly of claim 9, wherein when the sliding block is connected to the sliding groove, the installation bracket and an inner wall of the sliding groove cooperatively clamp the first stop part.

13. A fan with a bracket assembly comprising:
a main body, the main body being equipped with an installation fitting part; and
the bracket assembly, wherein the bracket assembly comprises an installation bracket, and at least one bendable and shapeable supporting leg; the installation bracket is equipped with an installation part; the supporting leg is connected to the installation part;

wherein the installation bracket is further provided with a sliding block arranged in a lengthwise direction of the installation part, and a second stop part arranged in a widthwise direction of the installation part, the installation fitting part comprises a sliding groove and a stop groove, the installation part is slidably connected to the installation fitting part in a manner that the sliding block is connected to the sliding groove, and the second stop part is connected to the stop groove, wherein the second stop part is equipped with a hollow handle.

* * * * *